United States Patent
Burnett et al.

(10) Patent No.: US 8,884,479 B2
(45) Date of Patent: Nov. 11, 2014

(54) OIL COOLED GENERATOR

(75) Inventors: Dwayne E. Burnett, Tuscon, AZ (US); Arturo Maceda, Mexicali (MX)

(73) Assignee: Honeywell International Inc., Morristown, NJ (US)

( * ) Notice: Subject to any disclaimer, the term of this patent is extended or adjusted under 35 U.S.C. 154(b) by 605 days.

(21) Appl. No.: 13/083,873

(22) Filed: Apr. 11, 2011

(65) Prior Publication Data

US 2012/0256501 A1    Oct. 11, 2012

(51) Int. Cl.
*H02K 9/00* (2006.01)
*H02K 9/20* (2006.01)
*H02K 9/19* (2006.01)

(52) U.S. Cl.
CPC .................................. *H02K 9/19* (2013.01)
USPC .............. 310/58; 310/59; 239/521; 239/504; 239/518

(58) Field of Classification Search
USPC ...................................... 310/52–64
See application file for complete search history.

(56) References Cited

U.S. PATENT DOCUMENTS

| | | | | |
|---|---|---|---|---|
| 2,626,836 | A | * | 1/1953 | Herron .................. 239/521 |
| 3,217,193 | A | * | 11/1965 | Rayner .................. 310/54 |
| 3,756,515 | A | | 9/1973 | Arnold |
| 4,959,570 | A | * | 9/1990 | Nakamura et al. .......... 310/54 |
| 5,682,074 | A | * | 10/1997 | Di Pietro et al. .......... 310/215 |
| 2004/0021007 | A1 | * | 2/2004 | Hakala .................. 239/524 |
| 2005/0151431 | A1 | * | 7/2005 | Cronin et al. .......... 310/60 A |
| 2008/0116298 | A1 | | 5/2008 | Langiewicz et al. |

OTHER PUBLICATIONS

Product: Spraying Systems Co. Company: UniJet TK nozzle spray tip Description: Precision-machined deflector surface provides accurate control of deflection and spray angle, Apr. 11, 2011.

* cited by examiner

*Primary Examiner* — Tran Nguyen
*Assistant Examiner* — Leda Pham
(74) *Attorney, Agent, or Firm* — Shimokaji & Associates P.C.

(57) ABSTRACT

An oil cooled generator may have stator windings with first portions in contact with a stator core and second non-contact portions. One or more nozzles may be configured to provide a spray pattern of oil which impinges on the non-contact portions even though the nozzles may have orifices oriented so that the lines projected in alignment with longitudinal axes of the orifices do not intersect the non-contact portions of the stator windings.

14 Claims, 4 Drawing Sheets

OIL COOLED GENERATOR

BACKGROUND OF THE INVENTION

The present invention generally relates to electrical generators in which circulated lubrication oil performs a cooling function.

In some electrical generating systems, specially-designed compact generators have a small size relative to anticipated electrical loads that may be applied to the generator. Such generators may be designed to be positively cooled with circulating lubrication oil. Generators of this type may be used, for example, to supply electrical power in a vehicle such as an aircraft.

Typically, such generators may employ spiral grooves within a housing to convey oil around a stator core to achieve cooling. Some portions of stator windings may extend beyond the stator core and these portions may not get effective cooling from the oil in the spiral grooves.

As can be seen, there is a need for a generator cooling system in which stator windings are effectively cooled by circulated lubrication oil.

SUMMARY OF THE INVENTION

In one aspect of the present invention, an oil cooled generator may comprise: stator windings with first portions in thermally-conductive contact with a stator core and second non-contact portions not in such contact; and one or more nozzles having a cylindrical orifice with a longitudinal axis oriented so that a line projected in alignment with the axis does not intersect the non-contact portions of the stator windings, the one or more nozzles configured to provide a spray pattern of oil which impinges on the non-contact portions.

In another aspect of the present invention, an oil spray system for cooling selected portions of a generator, may comprise: one or more nozzles with an orifice interconnected with a passageway for oil; the orifice having a diameter large enough to pass an integral stream of oil; the orifice having a longitudinal axis oriented so that a line projected in alignment with the axis does not intersect the non-contact portions of the stator windings that does not intersect the selected portions of the generator; the one or more of the nozzles having a deflection surface configured to produce a spray pattern of the oil which spray pattern impinges on the selected portions of the generator.

In still another aspect of the present invention, a method for cooling selected portions of a generator with an oil spray may comprise the steps of: supplying pressurized oil to a passageway in the generator; passing at least a portion of the pressurized oil through at least one nozzle orifice interconnected with the passageway to form a integral stream of oil; projecting the integral stream of oil along a path that does not intersect the selected location; deflecting the integral steam and producing a spray pattern of the oil from the integral stream; directing the spray pattern of the oil to impinge on the selected portions of the generator.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a generator with a lubrication-oil cooling system that includes oil spray nozzles for propelling oil onto portions of stator windings of the generator.

Figure 1:
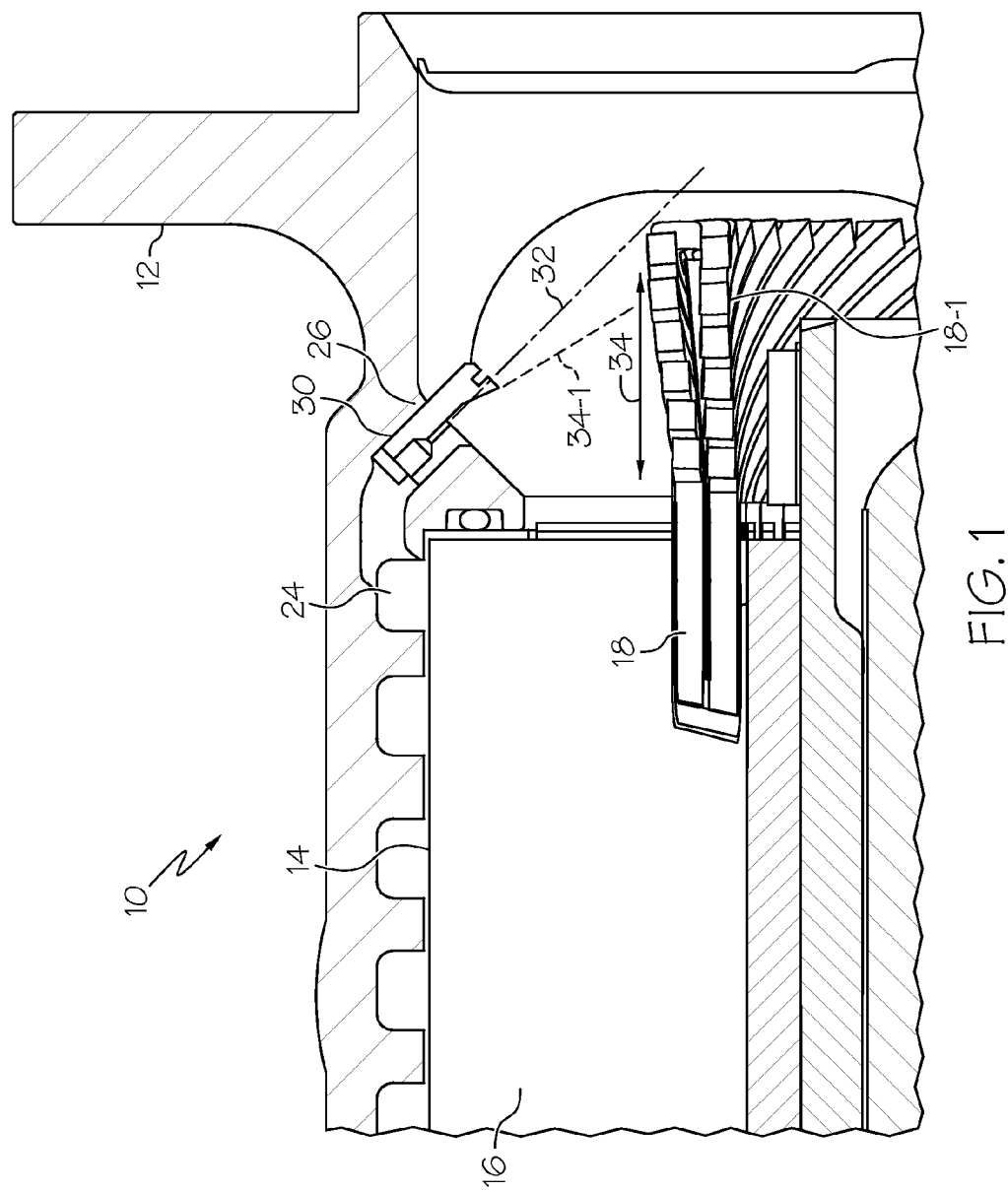
FIG. 1 is an enlarged view of a portion of an oil cooled generator in accordance with an embodiment of the invention.

Referring now to FIG. 1, an exemplary embodiment of an oil-cooled generator 10 may be seen to comprise a housing 12, a stator 14, a stator core 16, stator windings 18, a spiral groove 24 and nozzles 26. In operation, lubrication oil may be applied under pressure to the generator 10. The oil may pass through the spiral grove 24 and emerge into various passages (not shown) in the housing 12 before exiting the generator 10.

As the oil passes through the spiral groove 24, the oil may absorb heat from the stator core 16. The stator core 16 may, in turn, absorb heat from those portions of the stator windings 18 which may be in thermally-conductive contact with the stator core 16. Some portions of the stator windings 18 may not be in contact with the stator core 16. As to these portions, herein referred to as non-contact portions 18-1, there may be ineffective heat transfer to the stator core 16. In other words, the oil in the spiral grove 24 may not provide effective cooling of the non-contact portions 18-1 of the stator windings 18.

It may be seen that the nozzles 26 may be positioned to allow some of the oil to emerge from the spiral groove 24 so that an oil spray may be directed to the non-contact portions 18-1. In an exemplary embodiment, the nozzles 26 may be placed into the housing 12 within drilled holes 30. Multiple nozzles 26 may be spaced circumferentially around the housing at equal angular intervals. In an exemplary embodiment of the generator 10, three of the nozzles 26 may be spaced at 120 degree angular intervals.

In some generators, the housing 12 may be configured such that the holes 30 may only be drilled with a line 32 that passes through a region of the generator 10 which may not be coincident with location of the non-contact portions 18-1. This condition is illustrated in FIG. 1 wherein a line 32 that may represent a projection of the axis of the hole 30 does not intersect the non-contact portions 18-1.

In such a generator, for example the generator 10, the nozzles 26 may be configured to produce an fan-shaped oil spray pattern directed along a line 34-1. When the oil strikes the non-contact portions it may cover the non-contact portions in a spray region 34. In other words, the spray pattern 34-1 may have an orientation different from that of the line 32 even though the oil may flow out of the spiral groove 24 along the line 32.

Figure 2:
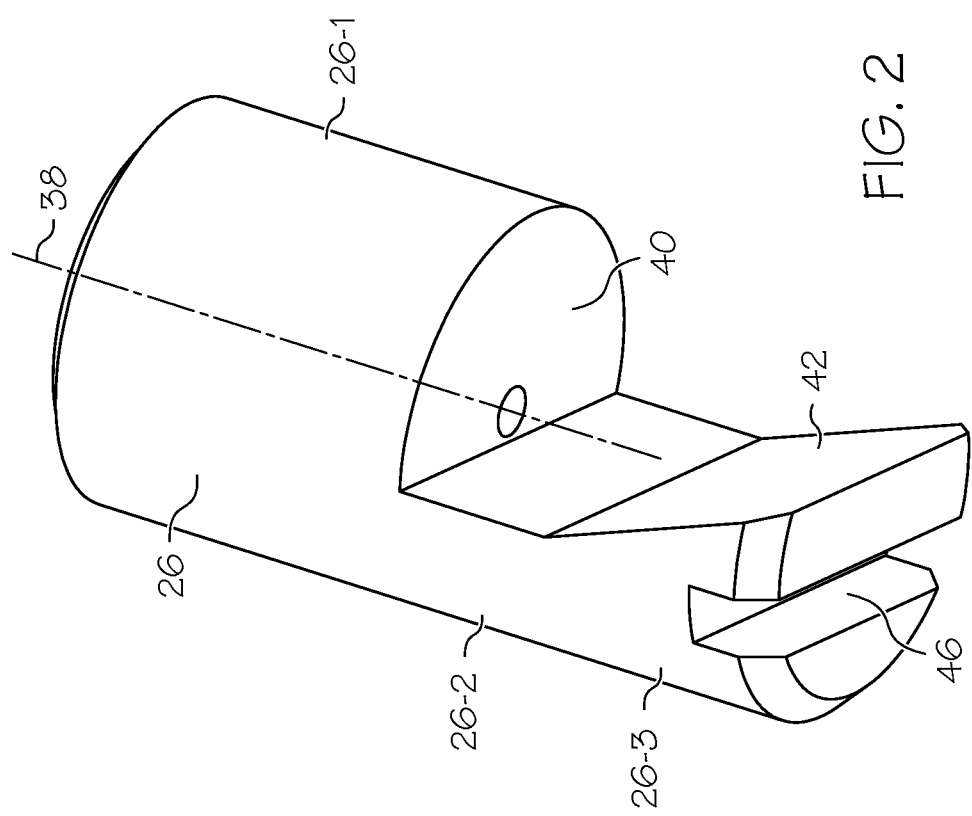
FIG. 2 is a perspective view of an oil spray nozzle in accordance with an embodiment of the invention.
Figure 3:
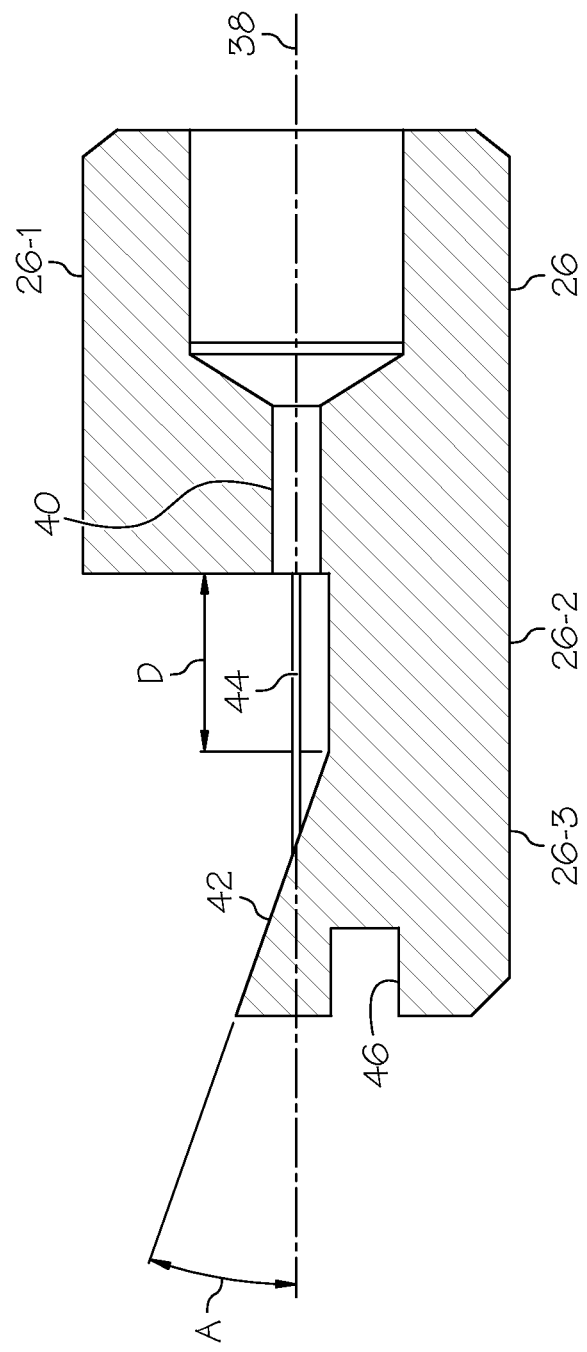
FIG. 3 is a cross-sectional view of the nozzle of FIG. 2 in accordance with an embodiment of the invention.

Within the generator 10, the desired spray region 34 and desired spray pattern orientation may be achieved with the nozzle 26 configured as shown in FIGS. 2 and 3. The nozzle 26 may have a generally cylindrical shape and may have an axis 38. A cylindrical orifice 40 may be formed coaxially with the nozzle 26. The nozzle 26 may have an orifice section 26-1, a cutout section 26-2 with a reduced cross-section and a deflection section 26-3. A deflection surface 42 may be formed on the deflection section 26-3. In an exemplary embodiment, the nozzle 26 may be provided with a threaded outer surface that may correspond to a threaded inner surface of the hole 30 in the housing 12. When the nozzle 26 is in position in the housing 12, the axis 38 of the nozzle 26 may be coincident with the line 32 of the hole 30.

Referring now to FIG. 3, a cross-sectional view of the nozzle 26 may illustrate that the cutout section 26-2 has a thickness less than half of the diameter of the orifice section 26-1. Consequently, oil emerging from the orifice 40 may flow unimpeded from the orifice 40 to the deflection surface 42. A diameter of the orifice 40 may be large enough to allow the oil to flow through and emerge from the orifice 40 as an integral steam 44. Thus, even though the spray pattern 34 is a desired output from the nozzle 26, the orifice 40 may be large enough so that here may be little or no risk of clogging of the orifice 40. In an exemplary embodiment, the orifice 40 may have a diameter of about 0.020 inch or larger.

As may be seen in FIG. 3, the integral stream 44 of the oil may pass unimpeded for a distance D before striking the deflection surface 42. The distance D may be about 5 to about 8 times as great as the diameter of the orifice 40. Upon striking the deflection surface 42, after traveling the distance D, the integral stream 44 of oil may break into a spray and the spray pattern 34 may form (see FIG. 1). In an exemplary embodiment, the defection surface 42 may be oriented at an angle A of about 30° to about 45° relative to the axis 38. The deflection surface 42 may be oriented orthogonally to a radius of the generator 10. A screwdriver slot 46 may be provided in the nozzle to allow an assembler of the generator 10 to produce the desired orthogonal orientation.

Figure 4:
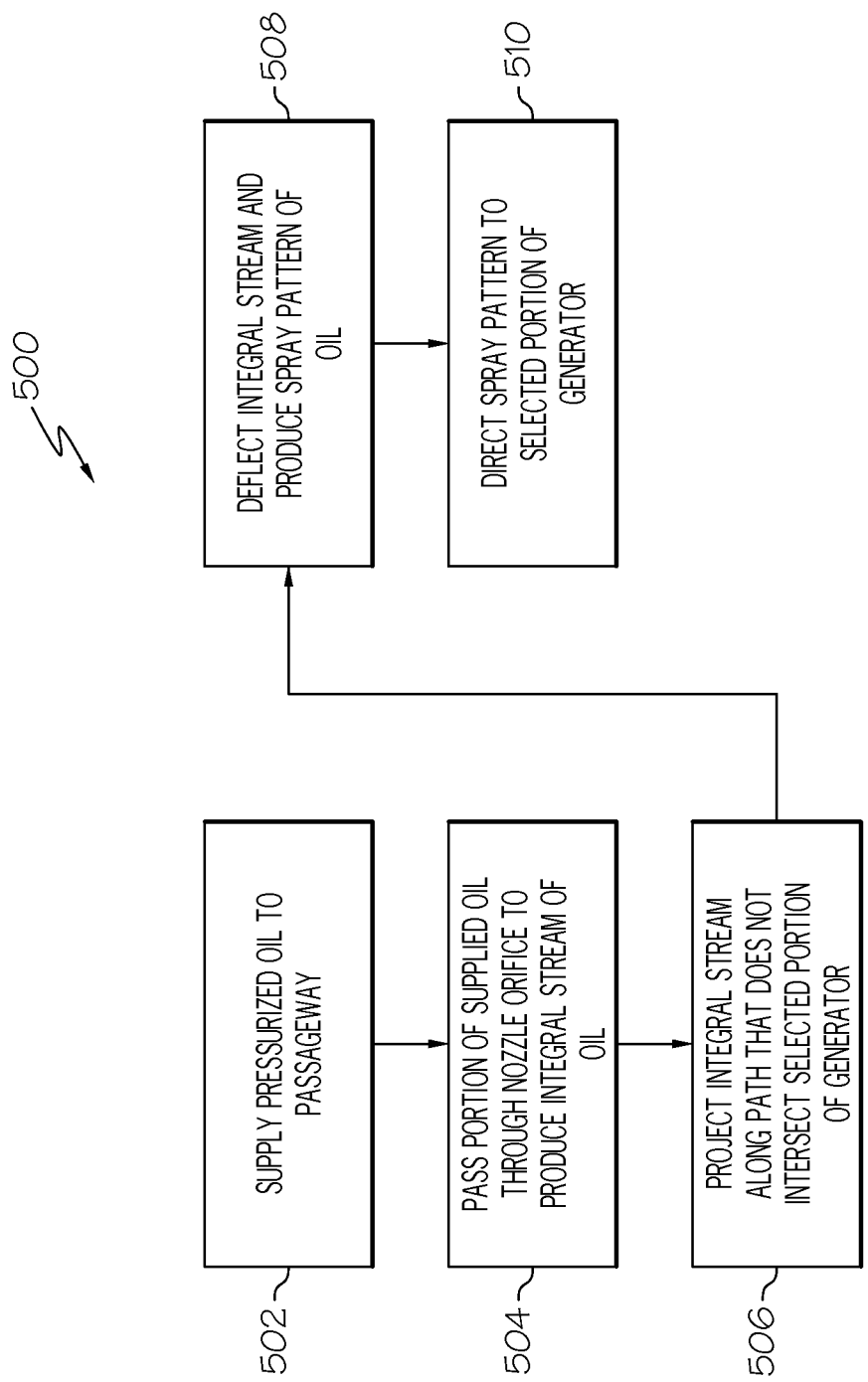
FIG. 4 is a block diagram of a method for spray cooling a generator in accordance with an embodiment of the invention.

Referring now to FIG. 4, a flow chart 500 may illustrate an exemplary method which may be employed to cool selected portions a generator with an oil spray. In a step 502, pressurized oil may be supplied to a passageway in a generator (e.g., oil may be supplied to the spiral groove 24 in the housing 12 of the generator 10). In a step 504, a portion of the pressurized oil may be passed through a nozzle orifice interconnected with the passageway to form a integral stream of oil (e.g., the oil may be passed through the orifice 40 of the nozzle 26 to form the integral stream 44). In a step 506, the integral stream of oil may be projected along a path that does not intersect the selected location (e.g., the stream 44 may be projected along the line 32 which does not intersect with the non-contact portions 18-1 of the stator windings 18). In a step 508, the integral steam may be deflected to produce a spray pattern of the oil from the integral stream (e.g., the integral stream 44 may impinge on the deflection surface 42 and the spray pattern 34-1 may form). In a step 510, the spray pattern of the oil may be directed to impinge on the selected portions of the generator (e.g., the deflection surface 42 may be oriented to direct the spray pattern region 34-1 onto the non-contact portions 18-1 of the stator windings 18).

It should be understood, of course, that the foregoing relates to exemplary embodiments of the invention and that modifications may be made without departing from the spirit and scope of the invention as set forth in the following claims.

We claim:

1. An oil cooled generator comprising:
   a housing with a spiral oil groove formed therein, the housing defining a housing interior;
   a stator core being in contact with the housing so that an outer surface of the stator core and the spiral oil groove produce an enclosed spiral passageway for oil;
   stator windings with first portions in thermally-conductive contact with the stator core and second non-contact portions not in such contact;
   a spray passage with a spiral passageway end and a housing interior end, the spiral passageway end fluidly connected with the spiral passageway, and the housing interior end fluidly connected with the housing interior; and
   a nozzle removably disposed in the housing interior end of the spray passage, and having a cylindrical orifice with a longitudinal axis oriented so that a line projected in alignment with the axis does not intersect the non-contact portions of the stator windings,
   the nozzle having a fluid inlet end, and a fluid outlet end, the fluid inlet end fluidly interconnected with the spiral passageway through the spray passage to form an oil flow path from the spiral passageway into the cylindrical orifice,
   the nozzle configured to provide a spray pattern of oil from the fluid outlet end which impinges on the non-contact portions.

2. The oil cooled generator of claim 1 wherein the nozzle is held in position by threaded engagement between the housing interior end of the spray passage and the nozzle.

3. The oil cooled generator of claim 1 wherein the oil emerges from the orifice of the nozzle in an integral stream.

4. The oil cooled generator of claim 3 wherein the nozzle comprises a deflection surface and wherein a line projected in alignment with the axis of the orifice intersects the deflection surface.

5. The oil cooled generator of claim 4 wherein the orifice of the nozzle is at least as large as 0.020 inch.

6. An oil spray system for cooling selected portions of a generator, comprising:
   one or more nozzles, at least one of the nozzles removably disposed at the end of a spray passage and having a fluid inlet end, a fluid outlet end, and an orifice, the fluid inlet end fluidly interconnecting the orifice with a spiral passageway for oil through the spray passage, the spiral passageway in thermal communication with a stator of the generator;
   the orifice having a diameter large enough to pass an integral stream of oil;
   the orifice having a longitudinal axis oriented so that a line projected in alignment with the axis does not intersect selected portions of the generator;
   the at least one of the one or more nozzles that is removable includes a deflection surface configured to produce a spray pattern of the oil which spray pattern impinges on the selected portions of the generator.

7. The oil spray system of claim 6 wherein the passageway is formed between a spiral groove in a housing of the generator and a stator core in contact with the housing.

8. The oil spray system of claim 6 wherein the orifice is at least 0.020 inch.

9. The oil spray system of claim 6 wherein at least one of the one or more of the nozzles comprises:
   a cylindrical body with an orifice section, a defection section and a cutout section positioned between the orifice section and the deflection section,
   the cutout section having a thickness less than one half the diameter of the orifice section, and
   a line projected in alignment with the axis of the orifice intersecting the deflection section but not intersecting the cutout section.

10. The oil spray system of claim 9 wherein the cutout section has a length D that is 5 to 8 times as great as the diameter of the orifice.

11. The oil spray system of claim 9 wherein the deflection section has a deflection surface oriented at an angle A, relative to the axis of the orifice, which is 30° to 45°.

12. The oil spray system of claim 11 wherein the deflection surface is positioned orthogonally relative to a radius of the generator.

13. The oil spray system of claim 6 wherein at least one of the one or more nozzles is held in position with threaded engagement between the nozzle and a hole in a housing of the generator.

14. The oil spray system of the claim 13 wherein a screwdriver slot is formed in the deflection section.

* * * * *